United States Patent [19]
Liebig

[11] 3,739,555
[45] June 19, 1973

[54] MODULAR AIR POLLUTION CONTROL SCRUBBER BED

[75] Inventor: Preston Dean Liebig, West Hartford, Conn.

[73] Assignee: Combustion Engineering, Inc., Windsor, Conn.

[22] Filed: Dec. 30, 1971

[21] Appl. No.: 213,857

[52] U.S. Cl. ............... 55/233, 55/483, 55/484, 55/518, 261/98
[51] Int. Cl. .......................... B01d 47/14
[58] Field of Search ............... 55/233, 91, 99, 220, 55/227, 229, 483–484, 242, 512, 494, 518, 519; 261/94–98, 114 R; 210/264, 284

[56] References Cited
UNITED STATES PATENTS

| | | | |
|---|---|---|---|
| 1,521,575 | 12/1924 | Wittemeier | 261/95 UX |
| 3,348,364 | 10/1967 | Henby | 55/233 X |
| 3,348,825 | 10/1967 | McIlvaine | 261/98 |
| 3,680,282 | 8/1972 | Kent | 55/233 |
| 3,683,593 | 8/1972 | Kent | 55/233 X |
| 3,696,589 | 10/1972 | Liebig et al. | 55/233 |

Primary Examiner—Frank W. Lutter
Assistant Examiner—Vincent Gifford
Attorney—Eldon H. Luther and Frederick A. Goettel, Jr.

[57] ABSTRACT

A gas cleaner incorporating a wet scrubber wherein the scrubber bed is made from self-contained basket-like modules which when in assembled relationship, are capable of carrying off water overflowing from the modules and thereby maintaining the desired turbulent level within the scrubber bed. The facing sides of adjacent modules are inclined inward so as to form a trough which catches the overflowing water, and which communicates with means for disposing of the overflowing water. A cover grill is provided for each bed module for the purpose of containing the filter material.

10 Claims, 4 Drawing Figures

INVENTOR.
PRESTON D. LIEBIG

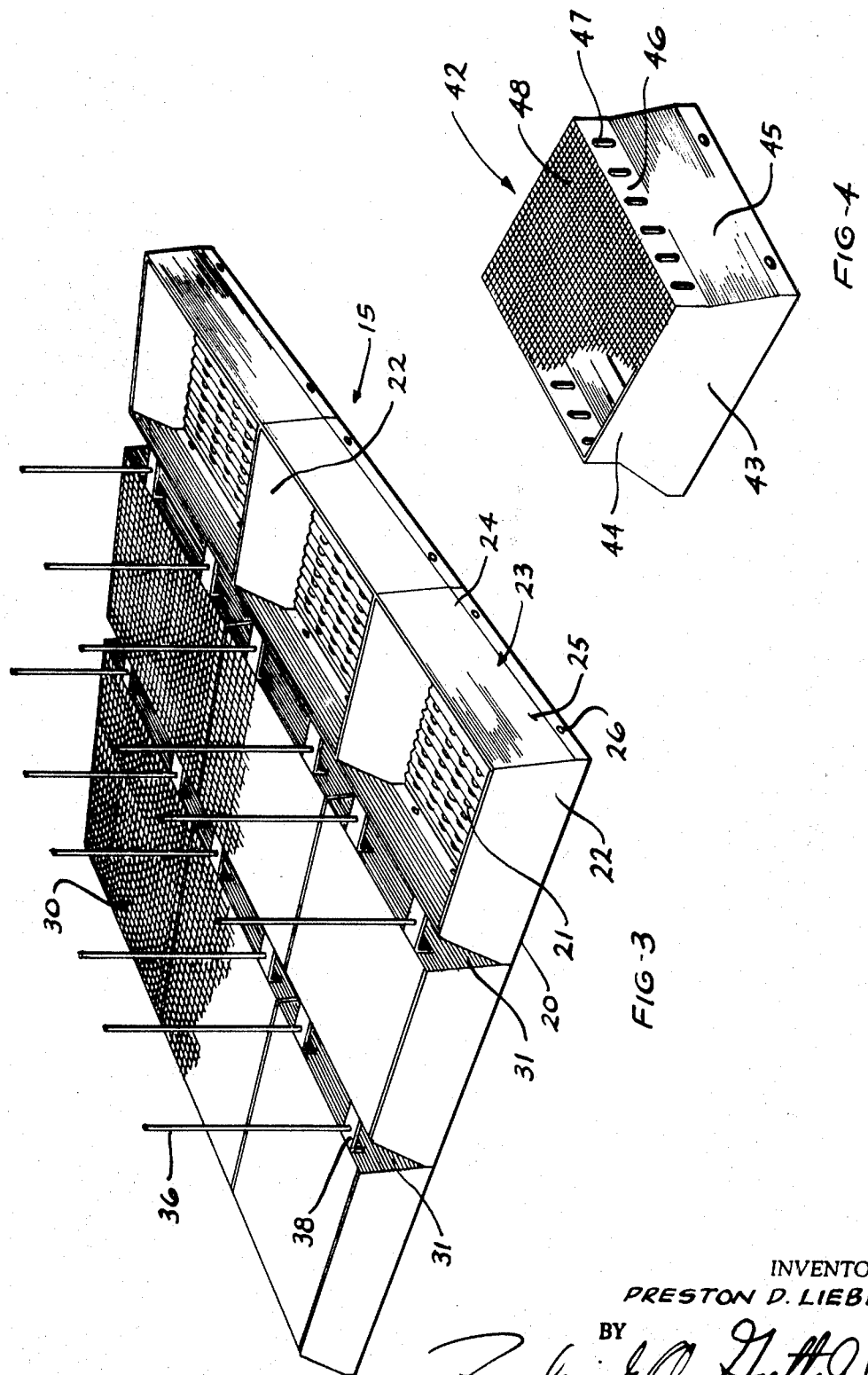

MODULAR AIR POLLUTION CONTROL SCRUBBER BED

BACKGROUND

1. Field of the Invention

This invention relates to pollution abatement equipment and particularly to a multi-section scrubber bed for a gas cleaner incorporating a wet scrubber. The sections are self-contained and when assembled to form a bed provide the capability of maintaining the turbulent level within the bed by collecting and discharging excess filter water.

2. Description of the Prior Art

The pollution of our environment is a serious problem with which the world is faced today. While pollution is a multi-faceted problem, the contamination of the air which we breath is probably one of the most frequently recognized pollution problems. There are three general categories into which air pollutants may be placed: particulate matter, gaseous contaminants, and odorous contaminants. A major source of such air pollutants are the stack emissions resulting from the combustion of fossil fuels in electric power generating systems. These emissions contain both particulate matter, such as fly ash, and certain gaseous compounds; the sulfur oxides being the most offensive, due to their damaging effects on plant life and possible adverse health effects.

A system has been developed which is capable of substantially reducing the solid and gaseous pollutants resulting from the fossil fuel combustion process. This system involves the feeding of an alkaline earth additive into the furnace firebox and wet scrubbing the flue gases. The additive reacts with the pollutants in the gases both in the furnace and, in solution with water, in the scrubber itself. The resulting compounds together with the particulate fly ash are removed in the scrubber wash water. The cleansed flue gases then pass through a mist eliminator to remove excess moisture from the gas prior to exhausting them to the atmosphere.

It is theorized that in order for a wet scrubber of the type described herein to remove a solid particle from a gas the particle must impact on a water droplet. The impaction efficiency is essentially a direct function of the relative velocity of the gas and an inverse function of the droplet diameter. Thus by designing to achieve high relative gas velocity and small droplet size a maximum extraction efficiency may be realized for a given amount of expended energy. In the flooded bed type scrubber these conditions are achieved by passing the dirty gas through a bed of filter material, which is typically a bed of smooth spherical elements such as glass marbles, with a water spray entering the bed from the top or bottom. The desired particle/water droplet contact occurs when the gas forces its way through the bed of wet filter material towards the gas exhaust duct. During this process an intense foaming action occurs in the upper layers of the filter bed. This foaming action produces a foam bed comprised of many small bubbles which provide increased contact between gas and water.

It has been recognized that, in order to optimize the gas-water contact conditions, it is desirable to maintain a pre-determined level of liquid turbulence in the filter bed during operation. Water levels in excess of this pre-determined level result in an overall decrease in the efficiency due to a decrease in the number of water droplet/contaminant particle impactions. Likewise, water levels less than the pre-determined level will also result in fewer droplet/particle impactions. This predetermined level is commonly referred to as the turbulent level of the scrubber. A well-known means for controlling the bed turbulent level is by the use of overflow drain sumps mounted in the filter bed adjacent the turbulent level. The sump is connected to a drain pipe which extends downwardly through the bed and outwardly through the scrubber housing to an appropriate disposal point. Such an arrangement is shown and described in more detail in U. S. Pat. No. 3,348,825 to R. L. McIlvaine.

Filter beds for such wet scrubbers have been made from a plurality of standardized modules. The number of such modules required to accomplish pollution control in any one application being dependent on the amount of flue gas to be cleaned and other desired design criteria. A drawback of arrangements of this type is that each module used must have its own overflow drain sump assembly and the associated plumbing necessary to dispose of the overflow water which passes through it.

Another drawback of prior art arrangements is the damage to the internal components of the scrubber which would occur if the scrubber bed is "blown". The term "blown bed" refers to the sudden release of pressure buildup due to gas flow which may occur if the filter bed becomes clogged with solid waste which temporarily impedes the flow of gas through the cleaner. As a result of such an occurrence the bed filter material would be spewed upward and cause damage to internal components.

SUMMARY OF THE INVENTION

In accordance with the present invention a gas scrubber of the type described above is provided with a multi-sectional bed wherein the plate means forming the facing sides of adjacent modules are oppositely inclined to form a trough therebetween. The height of the sides of the modules is equal to the pre-determined turbulent level of the system and this level is maintained by providing a liquid discharge means for disposing of water overflowing from the modules into the troughs. Each scrubber module is provided with a grill type cover which is capable of containing the filter material under normal operating conditions and, in the event the filter bed is "blown", as described above, the cover grill protects the mist eliminator and other internal components from damage. Overhead hanger means are provided to engage the inclined sides forming the troughs. As a result, no obstructions, structural or otherwise, are located under the filter bed where they would interfere with the scrubbing liquid spray and provide a surface for solid waste accumulation.

In accordance with a further embodiment of this invention the sides of each of the bed modules are extended vertically above the pre-determined turbulent level. A series of slotted openings is provided in these extensions which allow overflow to occur at the same pre-determined level while providing space for motion of the filter material above this level.

The principal object of this invention is to provide standardized filter bed modules which require no appurtenant overflow structure in order to maintain the desired turbulent level in the filter bed.

Another object of this invention is to provide a filter bed which provides protection for other internal components if the bed material is "blown".

It is a further object of this invention to provide self-contained, standardized bed modules which are readily interchangeable with like modules and which may be easily assembled with their complement of filter material prior to shipping and which are easily transported and stored.

Yet another object of this invention is to provide bed modules which when assembled to form a filter bed require no under-bed supporting structure and no under-bed piping for handling overflow water from the bed.

Other objects and advantages of the invention will become apparent upon reading the following detailed description and upon reference to the drawings.

BRIEF DESCRIPTION OF THE DRAWINGS

FIG. 3 is a perspective view of the modular scrubber bed removed from the scrubber housing; and FIG. 4 is a perspective view of a single bed module illustrating a modified means for achieving turbulent level control.

DESCRIPTION OF THE PREFERRED EMBODIMENT

Figure 1:
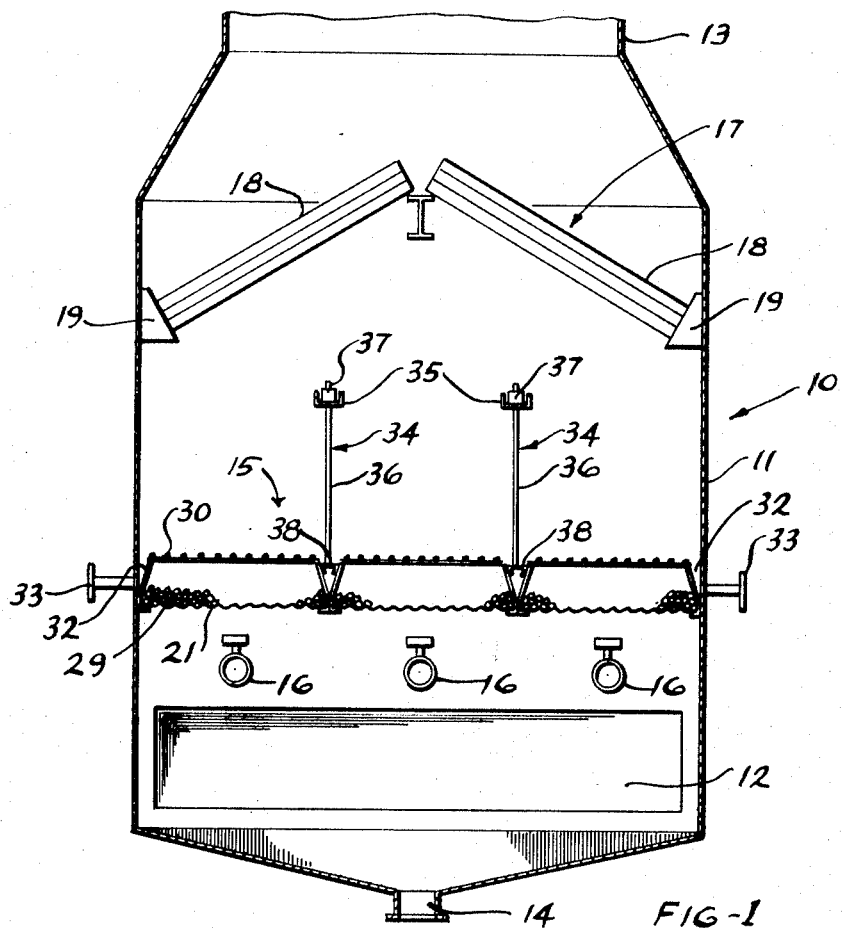
FIG. 1 is a cross-sectional view of the gas cleaner having a modular scrubber bed according to this invention.

Referring now to the drawings, FIG. 1 shows a gas cleaner 10 employing a web scrubber. The gas cleaner includes a housing 11 provided with a gas inlet opening 12 for contaminated gases to enter the cleaner and a gas outlet duct 13 for passing cleansed gases to a stack or other appropriate means for exhausting gases to the atmosphere. The gas to be cleaned is moved through the cleaner 10 by means of a fan (not shown) which is connected to the supply or discharge duct systems associated with the cleaner. A dirty water outlet 14 is located in the bottom of the scrubber housing for draining off used cleaning water and solid waste.

Located within the scrubber housing 11 is the scrubber bed assembly 15 of the gas cleaner 10. Positioned below the scrubber bed assembly 15 are a plurality of spray nozzles 16. Each of the nozzles 16 is connected through a network of supply piping (not shown) to an external source (not shown) of scrubbing liquid such as water. The nozzles 16 direct a spray of scrubbing liquid into the scrubber bed 15. A mist eliminator 17 is located within the scrubber housing 11, between the scrubber bed 15 and gas outlet duct 13. The mist eliminator 17 removes excess water from the cleansed gases before they are passed to the atmosphere and in the present instance comprises a series of angularly positioned baffles 18 having a Z-shaped cross-section which are oriented so as to impose several changes in flow direction to the exiting gas as it passes through the baffles. Excess water particles contained in the cleansed gases are not able to negotiate the tortuous path imposed by the baffle arrangement and as a result impact upon and adhere to the baffle surfaces. When sufficient water has accumulated, it flows downward on the baffle surface to a collector 19 positioned on the housing sidewall which in turn communicates with an appropriate disposal passage (not shown).

Figure 2:
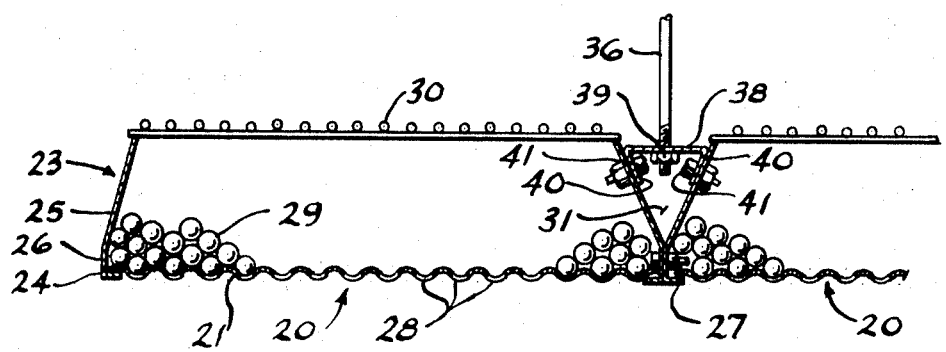
FIG. 2 is an enlarged cross-sectional view of two adjacent bed modules showing the details of the trough formed therebetween and of the lower hanger assembly.

In accordance with the invention the scrubber bed assembly 15 is made from a plurality of substantially identical basket-like modules 20. Each of the modules 20 includes a rectangular bottom plate 21 and four rectangularly arranged sidewalls. One set of sidewalls comprises two substantially vertically extending plates 22, and the adjacent walls comprise two opposing inwardly inclined sidewalls 23. As best shown in FIG. 2, each inclined sidewall 23 includes a small vertical portion 24 and a larger inwardly inclined portion 25 extending upwardly therefrom. Each vertical portion 24 is provided with a plurality of aligned openings 26 for use in attaching adjacent modules to one another or to the housing 11 by appropriate means such as a threaded connector assembly 27. The bottom plate 21 contains a plurality of openings 28 for the purpose of permitting free passage of the flue gas and the scrubbing liquid therethrough. While the bottom plate 21 shown in the figures is corrugated it may be fabricated from any material sufficiently rigid to support the weight of the bed filter material 29, which may be glass marbles or any other suitable material. An individual cover grill 30 is positioned over the open upper end of each of the bed modules 20 and is attached thereto by any suitable means. The gridwork of the grills 30 is of a size which will contain the filter material 29 within the modules 20.

As best shown in FIG. 3, when assembled in accordance with this invention a plurality of individual bed modules 20 are first arranged so that they abut one another on the small vertical portions 24 of facing inclined sides 23. As a result of this arrangement the inclined portions 25 of each pair of facing sides 23 cooperate to form a V-shaped trough 31 therebetween. FIG. 3 shows three sets of modules assembled in the above described manner, each set comprises three modules and thus results in the formation of two troughs. The three sets of modules are then positioned with facing vertical sides 22 in abutting relationship so that the troughs 31 of adjacent sets of modules are linearly aligned. While three sets containing three modules each are shown and described herein it should be understood that any number of sets and modules within sets may be used.

There are provided in the scrubber housing 11 a plurality of through overflow passages 32 which are arranged so as to align with the ends of each trough 31 formed by the assembled modules. Overflow passages 32 in turn communicate with drain pipes 33 which lead to an appropriate overflow disposal point such as a settling tank (not shown).

In accordance with a further aspect of the invention overhead mounting means 34 are provided which are adapted to support the modular bed assembly 15 described above. As illustrated in the drawings a plurality of said mounting means 34 is utilized, however, since each is identical only one is herein described in detail. Each of the mounting means 34 includes a support beam 35 whose ends are fixed to opposite ends of the scrubber housing 11 in overlying relation to the scrubber bed assembly 15. An elongated hanger rod 36 is suspended from the support beam, being attached at its upper end thereof by means of threaded connector 37.

The lower end of rod 36 extends through a hanger bracket 38 and is attached thereto by means of threaded connector 39. As best shown in FIG. 2, each bracket 38 is fabricated from a plate having the opposite ends thereof angularly positioned to form tab portions 40 which mate with the inclined portions 25 of facing sides 23 of two adjacent modules 20. Each tab 40 is attached to the side 23 with which it mates by suitable means such as threaded connector 41 extending through aligned openings in each of the tabs and sides.

In operation, contaminated gas is introduced into the gas cleaner 10 through inlet duct 12 and is caused to pass through the filter material 29 contained in the bed modules 20. At the same time the nozzles 16, which are disposed upstream of the bed in the gas flow sense, direct a continuous high pressure spray of scrubbing liquid into the bed of filter material 29 thereby effecting a turbulent intimate contact between the dirty gas and scrubbing liquid. As a result of this intimate contact, particulate contaminants in the gas are removed by the scrubbing liquid while gaseous contaminants are absorbed in solution by the scrubbing liquid.

As hereinbefore set forth it is desirable to maintain the level of turbulence within the filter bed 15 at a pre-determined level which will result in maximum cleaning efficiency. This is accomplished by making the height of the bed module sides 22, 23 equal to the desired turbulent depth. Thus when the level of turbulent scrubbing liquid rises above this level the excess will overflow into the troughs 31 and will be carried off through the overflow passages 32 and in turn will pass through drain pipes 33 which carry the overflow to an appropriate disposal place such as a settling tank.

Referring to FIG. 4, there is illustrated another embodiment of a bed module 42 adapted for use in a wet scrubber type gas cleaner. The bed module 42 is similar in construction to the bed module 20 previously described, however, each of the rectangularly disposed sides 43, 45 has an additional portion 44, 46 extending vertically therefrom to a level above the desired turbulent level of the scrubber bed. In the vertical extension 46 of each of the sides 45 containing the inclined portion there is provided a series of longitudinally aligned vertical slots 47. The lower end of each of these slots 47 is coincident with the pre-determined turbulent level of the cleaner system involved. As a result, the turbulent level within the bed module 42 is maintained by overflow through the slots 47 into the troughs formed when assembled as described above. The size of the slots 47 is such that they are small enough to contain the filter material 29 within the module 42 yet sufficiently large to permit the substantially unrestricted discharge of overflow liquid. As in the first described embodiment, a cover grill 48 extends over the open upper end of each module. Such a construction results in a confined volume between the liquid turbulent level and cover grill 48. Substantially unrestricted motion of the filter material 29, above the turbulent level, is permitted in this space. Such added freedom of motion enhances the action of the filter material in contacting the contaminants in the gas.

Attention is drawn to the fact that, as a result of the arrangements hereinbefore described, the underside of the scrubber bed assembly 15 is entirely free from structural support elements and the piping which is associated with conventional overflow (turbulent level control) techniques; elements which normally interfere with the liquid spray and gas flow and which provide additional surfaces on which deposits will collect.

As a further result of the above described arrangements, self-contained standardized bed modules for a web scrubber type gas cleaner may be made, resulting in low production costs and ease of assembly, transportation, and storage.

While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and scope of the appended claims.

I claim:

1. In combination with a gas cleaner of the wet scrubber type, the cleaner having a scrubber housing, a multi-sectioned bed of filter material positioned within said housing and a liquid spraying apparatus positioned within said housing for direction of liquid into the filter material of said bed, the improvement which comprises:
   a. a plurality of rectangularly shaped bed modules including plate means forming the sides of said modules, facing plates of adjacent modules being oppositely inclined to form troughs therebetween with said modules in assembled relation;
   b. means for mounting said modules within said housing;
   c. liquid discharge means for conducting overflow liquid from said modules into said troughs; and
   d. means for conducting overflow liquid from said troughs to an appropriate disposal place.

2. The apparatus of claim 1 wherein said liquid discharge means is defined by the upper periphery of said side plates.

3. The apparatus of claim 1 wherein only one pair of opposite sides of each of said modules is inclined.

4. The apparatus of claim 1 wherein the bottom of each of said modules comprises a corrugated plate supporting said filter material, said corrugated plates having a plurality of openings to allow flow of gas and liquid therethrough.

5. The apparatus of claim 1 wherein adjacent modules are assembled in abutting relationship, the facing inclined sides of said adjacent modules cooperating to form a trough having a substantially V-shaped cross section.

6. The apparatus of claim 1 wherein said mounting means comprises hanger structure including:
   a. a support fixed to said scrubber housing in overlying relation to said scrubber bed,
   b. at least one elongated rod fixed at one end to said support, and
   c. a bracket fixed to the other end of each of said rods and connected to the inclined sides forming said trough between two adjacent modules.

7. The apparatus of claim 1 wherein said liquid spraying apparatus is disposed within said housing adjacent to said bed and upstream from said bed with respect to the direction of gas flow in said cleaner.

8. The apparatus of claim 1 including a cover grill extending over the open upper end of each of said modules, said grill having openings which are smaller in size than the filter material contained in said modules.

9. The apparatus of claim 1 wherein said liquid discharge means is defined by a plurality of openings adjacent the upper end of the plates forming said troughs, said openings being smaller in size than the filter material contained in said modules.

10. The apparatus of claim 1 wherein said liquid discharge means comprises vertical portions extending above the plates forming the sides of said modules, at least one of said vertical extensions having a series of longitudinally aligned through slots disposed therein, said slots being sized so as to contain the bed filter material while allowing substantially unrestricted flow of overflow liquid therethrough.

* * * * *